W. LEWIS.
MOLDING MACHINE.
APPLICATION FILED SEPT. 9, 1919.

1,343,835.

Patented June 15, 1920.
6 SHEETS—SHEET 1.

Fig.1.

WITNESS:
Gustav Genzlinger.

INVENTOR
Wilfred Lewis
BY
Francis T. Chambers
ATTORNEY

UNITED STATES PATENT OFFICE.

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING-MACHINE.

1,343,835.

Specification of Letters Patent.   Patented June 15, 1920.

Application filed September 9, 1919. Serial No. 322,664.

*To all whom it may concern:*

Be it known that I, WILFRED LEWIS, a citizen of the United States of America, residing in Haverford, county of Montgomery, and State of Pennsylvania, have invented a certain new and useful Improvement in Molding-Machines, of which the following is a true and exact description, reference being had to the accompanying drawings, which form a part thereof.

My invention relates to molding machines of the type known as roll over jar molding machines, the leading features of which are shown and described in my patents numbered 1,157,403, 1,157,404 and 1,157,405. The object of my present invention is to generally improve the construction and mode of operation of such machines and particularly to so construct the machine that it will be capable of handling molds of widely different size and weight without dangerous strains on the mechanism—that the roll over mechanism may be adjusted to operate with molds of different sizes without affecting the table in its pattern drawing position—that the projecting stop arm on the roll over table can be eliminated—that the danger of projecting the anvil out of the machine in case of breakage is avoided— that the operation of the machine to roll over the table is prevented when certain important parts are improperly adjusted— that the elimination of strains tending to break the jarring piston is provided for.

The nature of my improvements will be best understood as described in connection with the drawings in which they are illustrated and in which—

A indicates the foundation for the machine, A' a casting supporting in part the casting which forms the lower portion of the two stationary cylinders, and formed or provided with the semi-circular grooves indicated at $A^2$, $A^2$. B and B' indicate the lower portion of the main cylinder in which the floating anvil moves, and of the auxiliary cylinder. $B^2$ and $B^3$ indicate the upper portions of said cylinders shown as formed in a separate casting. $b$ is a passage leading into cylinder portion B, and $b'$ a passage leading into cylinder B'. C is the floating anvil having a head or platform C' at its top and a cylinder $C^2$ formed in it as shown, and connecting through a port $C^3$ with the cylinder in which the anvil moves. Fitting in the base of cylinder $C^2$ is a thimble $C^4$ centrally perforated and having a valve seat $C^5$ at the top of its perforation. $C^6$ is a vertical hole formed in head C'; $C^7$, $C^7$, etc. spring chambers formed in the base of the anvil, $C^8$ a horizontal hole through head C' through which the trunnion pin H' passes. D is the jarring piston working in cylinder $C^2$. The piston and its upwardly extending stem are centrally chambered as indicated at D', $D^2$ indicating a port through which pressure air enters and instead of forming this piston integral with the mold supporting table $D^5$ I secure it to said table by a yielding joint approximating in character to a ball and socket friction joint, and this constitutes one feature of my invention and avoids the liability developed in practice to crack the piston D. As shown, the top of piston D, indicated at $D^3$, is formed as a head having spherical shoulders $D^4$, $D^4$, the lower shoulder fitting against a seat $D^7$ in the table $D^5$, and the upper shoulder fitting against a clamp or clamps $D^8$ held in place by bolts $D^9$. The table $D^5$ is formed with a port $D^{10}$, a vertical hole $D^{11}$, and with lugs $D^{12}$ having pin bearings $D^{13}$ formed in their ends. E is a cap piece fitting over the central opening D' of the piston D and having a downward tubular extension E', to the end of which is secured at $E^2$ the spacing spider and oil chamber indicated at $E^3$. $E^4$ indicates the oil feed regulating spindle, $E^5$ a spring abutting against the spider $E^3$ and against the perforated guide indicated at $E^6$, from which depends the spindle $E^7$, holding at its end a valve indicated at $E^8$, which coacts with the valve seat $C^5$.

Figure 1:
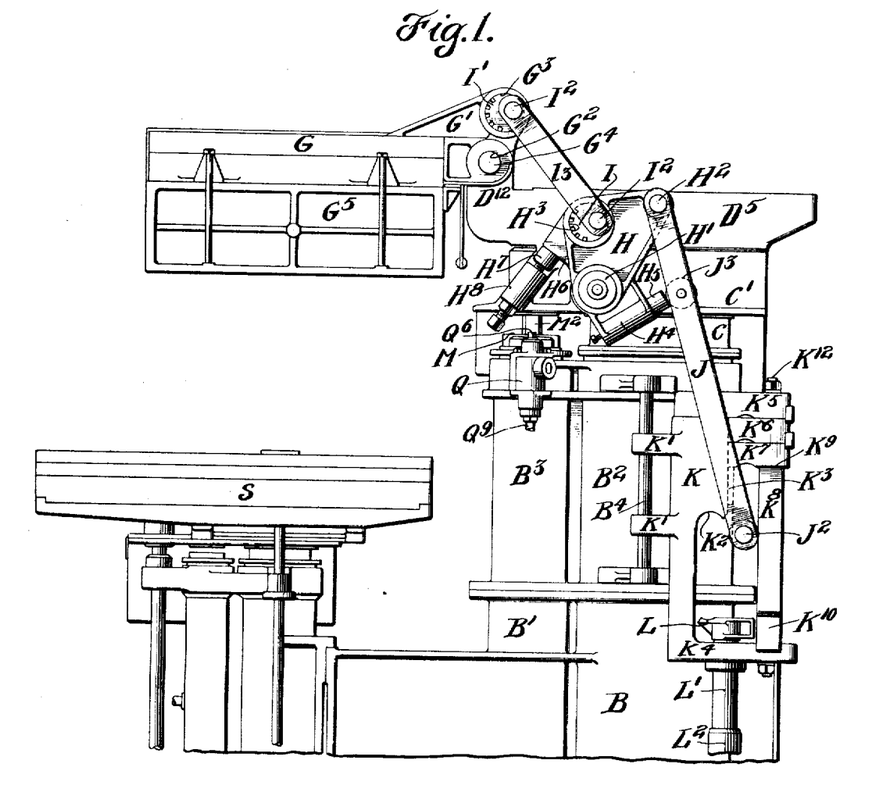
Figure 1 is a side elevation of the upper part of my improved machine in the position occupied by its parts after rolling over a mold and with some details omitted which are shown in other figures.
Figure 2:
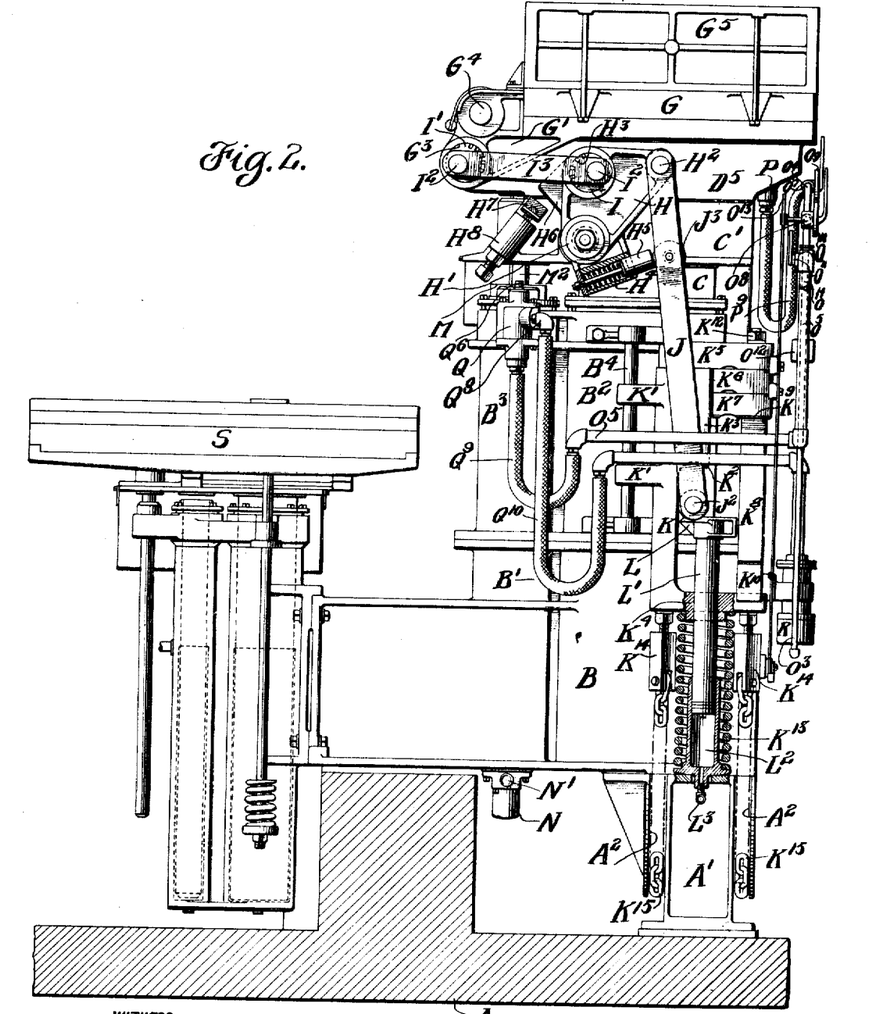
Fig. 2 is a similar view with the machine in the position it occupies during jarring and with more details shown.

The above described mechanism has to do with the air feed to and from the cylinder $C^2$ beneath the piston D, and need not be particularly described since it forms no part of my present invention. F, F, etc., are perforated heads fitting in the tops of the perforation $C^7$ in the anvil and have extending from them the hollow perforated tubes indicated at $F^2$, $F^2$, etc., $F^3$, $F^3$, $F^4$, $F^4$, etc., being coiled springs abutted against the bottom of the cylinder casting B and against the heads F, as shown in Fig. 4, and serving as a cushion for the anvil C. G indicates the roll over table which is formed with projecting arms $G'$, $G'$, in which, as shown best in Fig. 1, is formed the perforation $G^2$, through which passes a pin $G^4$, by means of which the roll over table is pivoted to the arms $D^{12}$ of the table $D^5$. The arms $G'$ also have formed in them the large bearings $G^3$. $G^5$ indicates the mold box secured on the roll over table G. H, H are bell crank levers turning on the trunnion pin $H'$ which extends through the floating anvil. These bell crank levers support the pins $H^2$ to which the links J, to be hereafter described, are pivoted and are formed with broad bushing seats $H^3$. $H^4$ indicates an arm extending out from bell crank lever H as indicated in Fig. 2, in which is secured a spring acting against a finger $H^5$; also formed on the bell crank levers are the shoulders $H^6$ which support the bell crank levers and the table G in proper rolled over position by abutting against adjustable stops indicated at $H^7$ secured in brackets $H^8$ on the table $C'$. I and $I'$ are eccentric bushings which are adjustably secured in the bearings $G^3$ and $H^3$, and which carry the pins $I^2$, $I^2$ to which are connected the two ends of the link $I^3$. This feature of construction, to wit, the double eccentric bushings, by which the links or connecting rods $I^3$ are connected to the bell cranks H and the arms $G'$, is an important factor of my invention by which the machine is adapted to handle mold boxes of different sizes and weights with due regard to the location of the center of gravity of the mass in the turning over operation and without affecting the adjustment of the table in pattern drawing position. J, $J'$, J, $J'$ are pairs of links pivoted to the pins $H^2$ of the bell crank levers H and carrying at their lower ends cross pins and rollers as indicated at $J^2$. These links also carry the rollers indicated at $J^3$, $J^3$, against which the fingers $H^5$ abut in certain positions of the bell crank levers. K, K are stop castings slidingly secured by means of lugs $K'$, $K'$ to rods $B^4$ secured on the castings $B^2$ and formed with a stop shoulder $K^2$ adapted to engage the roller $J^2$ on the links J, $J'$, in certain positions of said links. The stop castings K are, as shown, formed with forwardly projecting limbs $K^4$ at their bottoms and forwardly projecting limbs $K^5$ at their tops, these upper limbs being adapted to serve as stops, as are also the replaceable stop blocks $K^6$ and $K^7$, which are secured on rods $K^{12}$ extending between the limbs $K^5$ and $K^4$, and, as shown, are held in position when used by a bar $K^8$, the upper end of which, indicated at $K^9$, abuts against the stop block, and the lower end of which, forked, as indicated at $K^{10}$, forms a housing for a spring $K^{11}$, which thrusts the bar $K^8$ upward against the stop block. $K^{13}$, $K^{13}$ indicate springs supported on the casting $A'$ and acting against the lower part of the arm $K^4$ to thrust the stop blocks K upward. $K^{14}$, $K^{14}$ are adjustable shackles secured to the bottom of the limbs $K^4$ and to which are secured the ends of the chains $K^{15}$, which pass around the semi-circular slots $A^2$ and hold the stop blocks K in position against the thrust of the spring $K^{13}$. L, L are shoulders secured on the ends of piston rods $L'$ which pass through perforations in the limbs $K^4$ and enter cylinders $L^2$, which cylinders are connected to a conduit indicated at $L^3$ with a portion of the pressure air line to which air is admitted during the jarring operation of the machine and from which air is exhausted during the roll over operation of the machine, such a connection is indicated in Fig. 3 at $L^4$.

M indicates the piston working in the auxiliary cylinder $B'$, $B^3$. As shown, it is provided with a head $M'$, which abuts against the table $C'$ when the piston is forced upward and on which is formed a guideway for the pin $M^2$ secured in the perforation $C^6$ of the table $C'$, $C'$, and having an upward extension $M^3$ which extends into the perforation $D^{11}$ of the jarring table $D^5$. To the bottom of the piston M, which is made hollow, as shown, is secured the head $M^4$, having extending upward from it the hollow sleeve $M^5$, into the lower end of which is screwed the bushing $M^7$, and in which moves the guide spider indicated at $M^8$, to which is secured the upper end of the tubular rod $M^9$, on the lower end of which is secured the perforated valve indicated at $M^{10}$, the lower end of the rod and the valve through the port $b'$ formed in the bottom of the cylinder part $B'$.

Secured beneath the port $b'$ is the valve casing, indicated at N, having a lateral port opening $N'$ leading into it, and formed with a cylindrical body at the top of which is formed the annular valve seat indicated at $N^2$. $N^3$ is the sleeve suitably guided in the casing N, as shown, and having formed on or secured to its upper end the valve indicated at $N^4$, having an annular seating portion $N^5$ adapted to seat itself on the seat $N^2$, and an interior valve seat portion indicated at $N^6$. $N^7$ is a valve normally seated against the seat $N^6$ and formed with a perforation $N^8$ having a valve seat at its top, an opening through lateral orifices into the sleeve $N^3$ and through it to the casing N. This valve is normally held against the seat $N^6$ by a spring indicated at $N^9$, supported, as shown, in the sleeve $N^3$.

Figure 3:
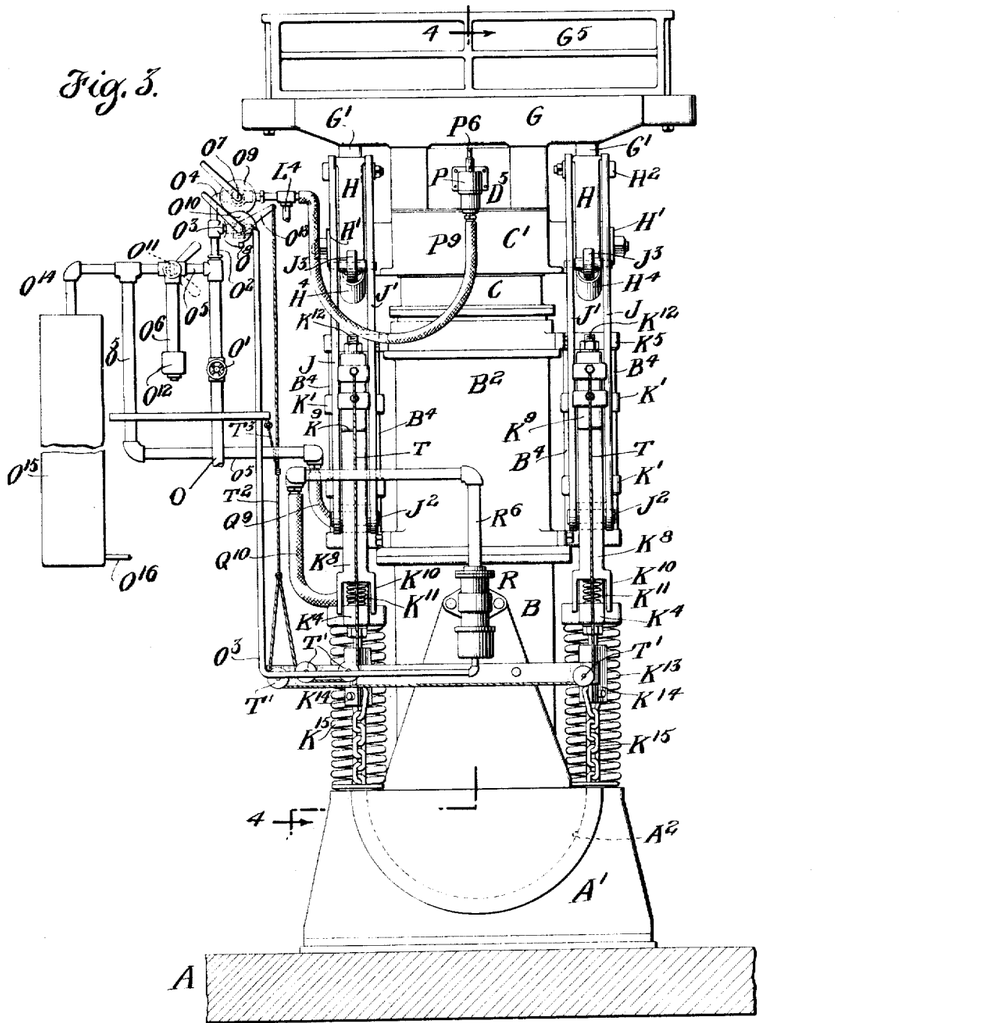
Fig. 3 is a front elevation of the machine as shown in Fig. 2 with the fluid tank which connects with the auxiliary cylinder and its connections to the pressure air system indicated.
Figure 4:
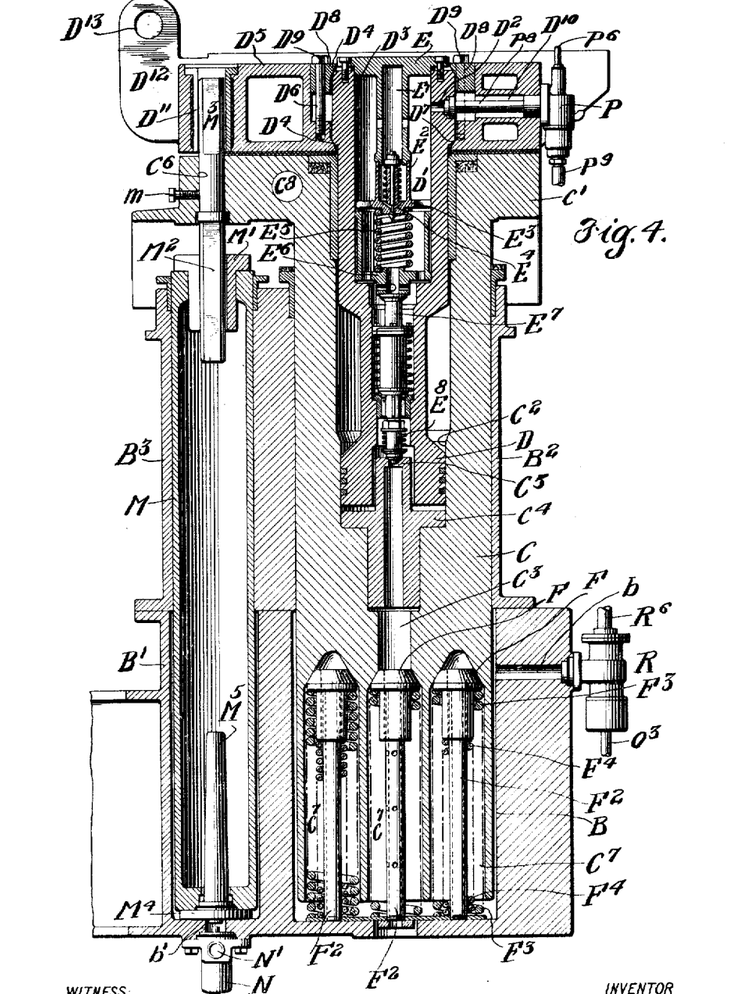
Fig. 4 is a vertical central section taken as on line 4—4 of Fig. 3.

Referring next to the system by which air under pressure is introduced to the machine O, Fig. 3 is the air supply pipe, $O'$ a cut-off valve, $O^2$ a branch of the supply pipe from which extend the two branches $O^3$, $O^4$, and $O^5$ is a third branch, $O^6$ being a branch pipe connecting the branch $O^5$ to exhaust and provided with a flow restricting device at its end, as indicated at $O^{12}$. $O^7$ and $O^8$ are valves in the branches $O^4$, $O^3$, and, by preference, these valves are interlocked as by means of interlocking disks indicated at $O^9$ and $O^{10}$, for purposes which will be hereafter described. $O^{11}$ is a valve located at the junction of the branch $O^5$ and the exhaust pipe $O^6$, by means of which the branch $O^5$ can be cut off from the supply pipe O and opened to exhaust when the valve $O^{11}$ is in the position indicated in dotted lines, or cut off from exhaust and connected to the air supply pipe by turning the valve through 90°. In addition to the valve handles for normal operation of the valves, indicated in Fig. 3, I provide the valve $O^8$ with a second actuating lever indicated at $O^{13}$, for purposes which will be hereafter described. $O^{14}$ is a branch of the air conduit $O^5$ leading to an oil tank $O^{15}$, from the bottom of which a pipe indicated at $O^{16}$ is connected to the port $N'$ of the valve casing N.

Figure 6:
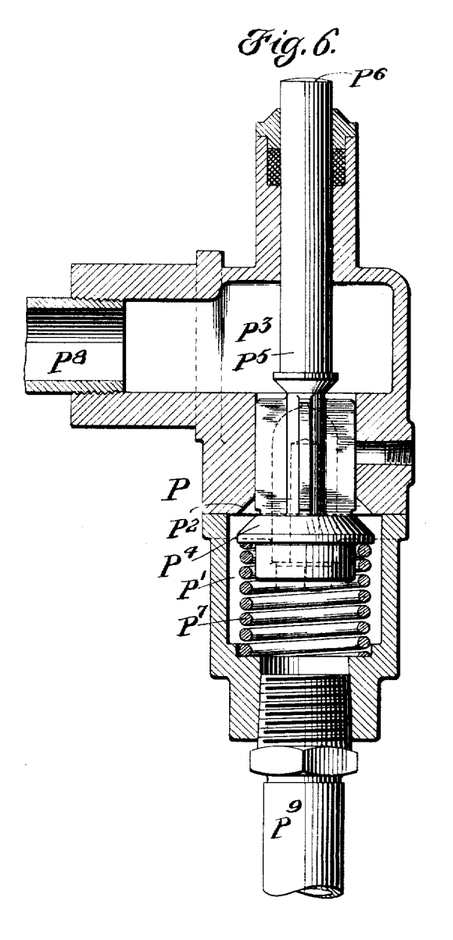
Fig. 6 a sectional view of the valve indicated at P.

P is the valve through which air is admitted to the machine for jarring. As shown in Fig. 6, the casing is formed with chambers $P'$, having a valve seat $P^2$ at its top, and connecting through a port with the chamber $P^3$. $P^4$ is the valve located in the chamber $P'$ and secured to a spindle $P^5$, the upper end of which, indicated at $P^6$, is so located that the roll over table G, when resting on the jarring head $D^5$, will press down the spindle $P^5$ and open the valve $P^4$, which valve is pressed upward toward its seat by the spring $P^7$. The chamber $P^3$ has extending from it a pipe section $P^8$, which extends through the passage $D^{10}$ on the head $D^5$, and connects with the port $D^2$ leading into the internal chamber of the piston D, as shown in Fig. 4. The lower chamber $P'$ is connected by a flexible hose, indicated at $P^9$, with the conduit $O^4$, so that when the valve, indicated at $O^7$, is open the air will flow freely into the valve casing P, and when the valve $P^4$ is open, into the jarring cylinder.

Figure 5:
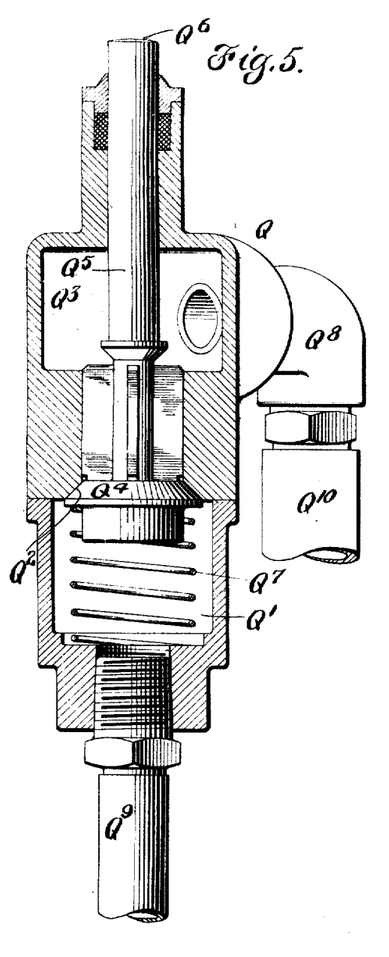
Fig. 5 is a sectional view of the valve indicated at Q.

Q is a valve casing secured to the top of the auxiliary piston M, and having the internal construction best shown in Fig. 5, that is, it is formed with a lower chamber $Q'$ having a valve seat $Q^2$ at its top and communicating through said valve seat and port with the chamber $Q^3$, $Q^4$ being a valve adapted to seat itself in the valve seat $Q^2$ toward which it is pressed by the spring $Q^7$, the valve having extending from it the actuating rod $Q^5$, the upper end $Q^6$ of which is pressed down by contact with the under side of the head $C'$ of the floating anvil when the piston M is raised into contact with said head. The chamber $Q'$ is connected by a flexible hose $Q^9$ with a conduit $O^5$ and the chamber $Q^3$ through an elbow $Q^8$ connects through a flexible hose $Q^{10}$ by which it is placed in communication with the pipe indicated at $R^6$ leading to the valve R, as will be hereafter described.

Figure 7:
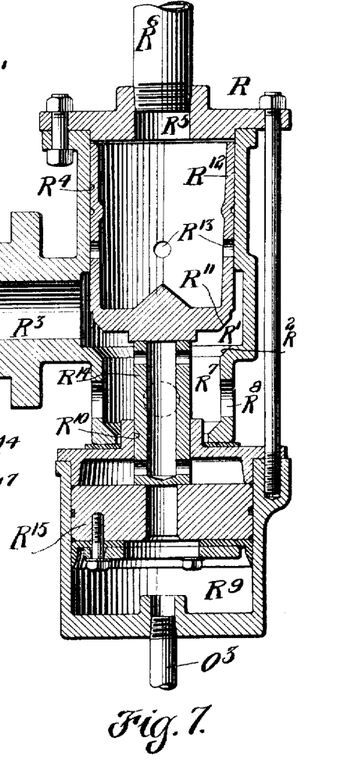
Fig. 7 is a sectional view of the valve indicated at R.

The valve R, the detail of which is best shown in Fig. 7, is secured on the front of the casting B, as shown in Fig. 4, and has formed in it a chamber $R'$, with a valve seat $R^2$ at its bottom, and a lateral port $R^3$ leading into the bottom of the cylinder in which the floating anvil moves through a port $b$. The upper part of the chamber $R'$ forms a cylinder $R^4$, with a port $R^5$ leading into its top, to which port is connected the pipe $R^6$, connected in turn to the flexible hose $Q^{10}$, as already stated. Below the valve seat $R^2$ is formed a sleeve $R^7$ opening freely through ports $R^8$ to the atmosphere and to which is connected a cylinder $R^9$, having a piston rod bearing $R^{10}$ formed in its top. $R^{11}$ is a valve adapted to seat itself on the seat $R^2$ and formed with a cylindrical extension $R^{12}$ which works in the cylinder $R^4$, and in which are formed openings $R^{13}$, which, when the valve is raised, are closed by coming in contact with the walls of the cylinder $R^4$, but which are open to the chamber $R'$ when the valve is in its lower position. From the bottom of the valve $R^{11}$ extends the perforated piston rod $R^{14}$ with openings formed through it at top and bottom, as shown, and connected at its lower end with the piston $R^{15}$ working in the cylinder $R^9$. The bottom of the cylinder $R^9$ is connected, as shown, with the air conduit $O^3$.

At S I have indicated an elevator construction upon which the mold box is deposited after the roll over action of the machine and while the pattern is being drawn. As this part of the machine forms no part of my present invention I have not shown it in detail or any of its parts.

In its operation solely as a jarring machine the apparatus shown presents no particular feature of novelty except in two features. The valves O' and O⁷ being open, the pressure air passes through conduit O⁴ and hose P⁹ to chamber P' of casing P, and the roll over table G, resting on head D⁵, presses down stem P⁵ and valve P⁴, permitting the air to pass to chamber P³ and through pipe P⁸ and port D² to the chamber D' formed in piston D. Thence it passes to cylinder C², the valve E⁸ being seated on port C⁵, and forces up piston D and the parts supported by it, while at the same time it forces down the floating anvil against the pressure of its cushion springs F³, F⁴. The valve E⁸, owing to its elastic support, maintains contact with its seat for a time during the described movements of the anvil and piston, but is finally lifted therefrom permitting the air in cylinder C² to exhaust through thimble C⁴ and port C³ to the bottom of cylinder D and port b, from which it passes to port R³ and chamber R' of valve R, and the valve R¹¹ being open, as shown in Fig. 7, the air exhausts freely through passage R⁷ and vents R⁸. The valve R¹¹ is held open by admitting air to cylinder R⁹ through conduit O³, the valve O⁸ being opened during the jarring operation. The exhaust of air from cylinder C² permits the fall of piston D and the parts supported by it, including the mold, and permits also the simultaneous rise of the anvil C and the jarring of the mold is thus effected. The operation being rapid and continuous, as of course the valve E⁸ closes whenever the piston D moves down and the anvil moves up.

As heretofore constructed the piston D, and parts connecting it with the jarring head D⁵, have been rigidly connected to the head or formed of a single casting, and the strains occurring during jarring have shown a tendency to break or crack the piston or its connections. To overcome this defect I have made the piston a separate part from the head and secured them together by a yielding connection, so that the piston can have a very slight angular movement with respect to the head. This is best accomplished as shown in Fig. 4 where the union of the piston and head is in the nature of a ball joint, though practically unyielding except under the severe strains induced by jarring.

Another novel feature having to do with the jarring operation of the machine, though it acts upon devices which operate during the roll over operation, is the introduction of a supporting device which lifts and presses against the roll over mechanism on the floating anvil during jarring and releases it during the roll over action. As shown, the opening of valve O⁷ in conduit O⁴ permits air to pass through conduit L⁴ and L³ to the cylinders L² raising the pistons L' and supporting heads L into contact with the ends of links J, pressing them upward and putting all the joints of the bell crank levers H, H, and parts connected to them, under pressure so that they will not rattle during jarring and will not be so liable to wear. The closing of the valve O⁷, of course, permits the air to exhaust from cylinders L² and the piston L' to move down to non-operating position as shown in Fig. 1.

Referring now to those parts of the machine which have to do with the roll over operation, I will explain first, that after the jarring of the mold is completed, and when it is desired to roll it over into position for drawing the pattern, the valves O⁷ and O⁸ are closed and they are shown in their closed position in Fig. 3, and it will be noticed that in this position the interlocking disks O⁹ and O¹⁰ are so interlocked that the valve O⁷ cannot be opened until the valve O⁸ is first opened, and it will also be noticed that the interlocking between the disks is such that when the valve O⁷ is opened the valve O⁸ cannot be closed. The air being shut off from the jarring mechanism the valve O¹¹ is opened so as to admit air to the conduit O⁵ and to close the exhaust pipe O⁶. The air under pressure will also flow through the branch pipe O¹⁴ into the oil tank O¹⁵, from which the oil will pass through the port O¹⁶ to the port N' of the valve N. From the pipe O⁵ the air passes through the hose Q⁹ to the valve Q and into the chamber Q', and, when the auxiliary piston M is raised, so that its head M' comes in contact with the head C' of the floating anvil, the spindle Q⁵ is pressed down opening the valve Q⁴ and letting the air pass to the chamber Q³, and thence to the hose Q¹⁰, from which it passes to the pipe R⁶ and into the top of the cylinder R⁴, pressing down the piston R¹² and seating the valve R¹¹ on the seat R², so that the air will pass through the ports R¹³ of the piston into the chamber R' and through the passage R³ and the port b into the bottom of the cylinder B, where it acts against the floating anvil as a piston and moves it upward. As the floating anvil moves upward it carries with it the bell cranks H, H, and, of course, the jarring head D⁵, the roll over table G, the mold secured to the roll over table, and the linkage connected with the bell cranks, so that the links J, J', J, J' move upward until their cross bars J² engage with the stops K². During the further upward movement of the floating anvil the upward movement of the links being arrested by the stops the bell cranks are turned toward the right on their trunnions, and through connecting rods I² and the arms G' of the roll over table a rotative movement is imparted to the roll over table moving it from the position shown in Fig. 2 to that shown in Fig. 1, in which position the elevator table S is moved up to receive the mold. During the latter part of the roll over operation the table G moves downward by gravity and the bell crank levers H, and linkage connected therewith, are brought about to the position indicated in Fig. 1, the fingers H⁵, spring supported in the arms H⁴ of the bell crank levers, pressing against the rollers J³ so as to swing the links J, J′ out into the position shown in Fig. 1. The further upward movement of the floating anvil during the period in which the cross bars of the links J, J′ move in between the faces K³ and K⁸ result in the drawing of the pattern. At the end of this drawing operation the cross bars J² come in contact with a stop which may be K⁵, K⁶ or K⁷, as desired, and again the arresting of the upward movement of the links J, J′ turns the bell cranks H on their trunnions with the result of turning the roll over table back to the position shown in Fig. 2. Again the final movement of the roll over table is accomplished by gravity, and with the completion of the backward roll over action the pressure air is, of course, shut off by turning the valve O¹¹ to the position indicated in Fig. 3, which permits the escape of air from the pipe O⁵, and parts connected therewith, through the exhaust pipe and head O⁶, O¹², so that the machine resumes its position for jarring as shown in Fig. 2.

In a general way, the action of the machine when rolling over the mold is similar to that of the machine described in my before mentioned former patents, and perhaps the most important improvement on my earlier construction is involved in my use of the similar eccentric bushings I and I′, located respectively in the bell crank H and the arm G′ of the roll over table, these bushings carrying the pins I², I² to which the connecting rods I³ are secured, so that by adjusting the bushings provision can be made for variations in the center of gravity of different mold boxes secured on the roll over table, and in all cases the center of gravity can be made to pass the dead point in the rotative movement of the roll over table.

The use of the two eccentric bushings also makes it feasible for me to use the arm H⁴ and spring supported finger H⁵ as a means for throwing the links J, J′ outward, which could not be successfully done if only one eccentric bushing were used. Again the use of the two eccentric bushings makes it feasible to hold the roll over table in pattern drawing position by utilizing the shoulder, such as H⁶, on the bell crank levers and a stop, such as H⁷, secured on the floating anvil, and this is a feature of considerable importance in my improved machine.

Referring now to the stop devices which arrest the upward movement of the links J, J′, and thereby effect the rolling over of the table, as described, in my new construction I provide independently movable stops to coact with each pair of links J, J′, the stops being normally in alinement with each other and in fixed position, but capable of independent motion. Thus, as shown, the two stop supporting castings K, K are slidingly secured by the lugs K′ on the rods B⁴ and are held in fixed position by the chains K¹⁵ passing through the circular grooves A² and the springs K¹³, and the two stop castings are normally arranged so that the stop shoulders K² are at the same level, and so that the stop shoulders K⁵, K⁶ or K⁷, which are in use, are also at the same level, and I secure to each of the castings K, or to some part affixed to them, cords T, T, see Fig. 3, which pass over guide pulleys, as indicated at T′, T′, etc., and are attached to a cord T², the upper end of which is attached to a lever arm O¹³ secured to the valve O⁸, and occupying the position shown in Fig. 13 when the valve O⁸ is closed. The weight of the cord T² is preferably relieved from the lever arm O¹³ by supporting it on a light breakable cord as indicated at T³. The result of this construction is that should either of the stop castings move upward from their normal position the cord T² would be drawn down, breaking the cord T³, if used, and pulling down the lever O¹³ so as to open the valve O⁸, allowing fresh air to pass through the conduit O³ into the cylinder R⁹, forcing up the piston R¹⁵ and opening the valve R¹¹, permitting the pressure air in the cylinder B to escape, with the consequence that all upward motion of the floating anvil is arrested and the anvil, and parts supported thereon, permitted to sink downward. All danger of projecting the floating anvil from the machine is avoided by this construction, for, of course, in case of breakage of parts which might result in the projection of the anvil the stop castings are necessarily moved and the air pressure relieved, as described.

The safety devices above described also come into operation in case of any mal-adjustment of the parts having to do with the roll over operation, so that the machine cannot be operated to roll over unless the parts are properly and coördinately adjusted.

Referring next to the auxiliary cylinder and piston, it will be understood that the auxiliary piston M is used to supplement the air pressure acting through the floating anvil during the roll over operation, and also that it is an important function in opposing and easing the momentum of the roll over table and mold at the end of the roll over operation in either direction. It was, of course, contemplated in my former machines, where such an auxiliary cylinder and piston is described, that they should accomplish this function, and in my present machine I have provided means by which they will accomplish the function under the trying conditions of use more effectively.

Figure 8:
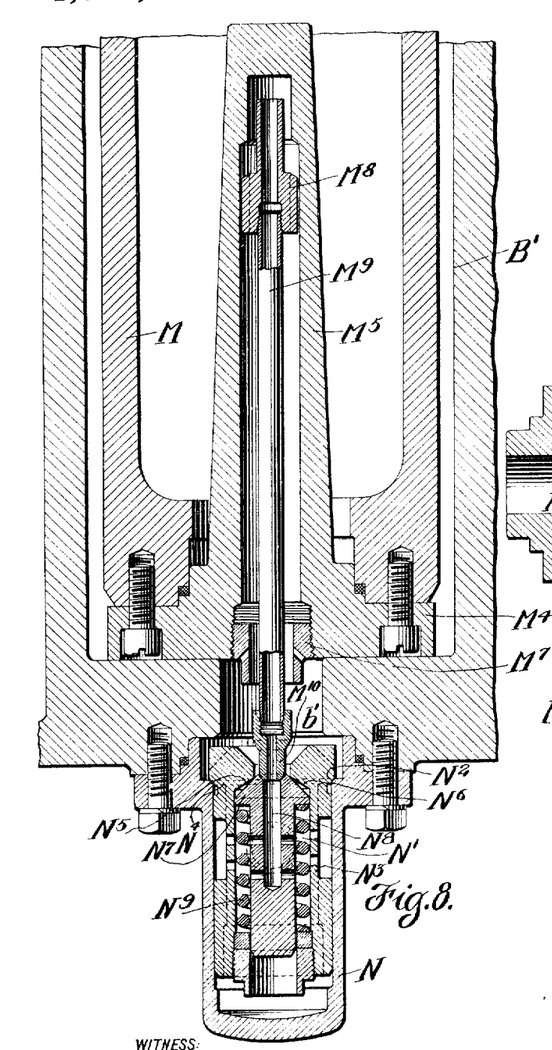
Fig. 8 is a central vertical view of the lower parts of the auxiliary cylinder and piston and of the valve indicated at N.

Referring to the construction as shown in Fig. 8, the pressure air when turned on to effect the roll over operation passes to the tank O¹⁵ as indicated in Fig. 3, and the oil in this tank passes through the conduit O¹⁶ into the casing N, and raising the valve head N⁷ passes through the port b' into the bottom of the cylinder B', where it acts against the piston M and forces it upward, so that its head M' comes in contact with the head C' of the floating anvil and helps in the duty of raising the anvil and the parts supported thereby. As the piston M travels upward the valve M¹⁰ remains seated over the port N' until the head M⁸ comes in contact with the stop M⁷ when it is lifted and carried up with the piston.

On the return movement of the piston M the oil flows through the open port N⁸ and back to the tank through the port N', and in case of any excess pressure occurring the valve N⁷ would be forced away from its seat giving a still further clearance for the flow of oil. Toward the end of the downward movement of the piston the valve M¹⁰ seats itself in the port N⁸, so that normally the oil will have to flow upward through the tubular extension M⁵ into the end of the guide M⁸, and thence through the tube M⁹ and through the perforation in the valve M¹⁰. Again any excess pressure will force open valve N⁷, and the whole arrangement is such as to afford a necessary and well guarded resistance to the varying pressures due to the roll over operation and the rising and falling of the floating anvil.

Having now described my invention what I claim as new and desire to secure by Letters Patent is:

1. In a molding machine having a base, floating anvil, mold support, a roll over table hinged to said support, and means for causing a vertical movement of the anvil to communicate a roll over movement to the table including a rock lever pivoted on the anvil, and a connecting rod connecting said rock lever to the table, the improvement which consists in providing adjustable eccentric bushings in the rock lever and table, said bushings carrying the pins to which the connecting rod is secured.

2. In a molding machine having a base, floating anvil, mold support, a roll over table hinged to said support, and means for causing a vertical movement of the anvil to communicate a roll over movement to the table including a rock lever pivoted on the anvil, and a connecting rod connecting said rock lever to the table, the improvement which consists in providing adjustable eccentric bushings in the rock lever and table, said bushings carrying the pins to which the connecting rod is secured, in combination with a fixed stop on the anvil against which the rock lever abuts when the table is in pattern drawing position.

3. In a molding machine having a base, floating anvil, mold support, a roll over table hinged to said support, and means for causing a vertical movement of the anvil to communicate a roll over movement to the table including a rock lever pivoted on the anvil, a connecting rod connecting said rock lever to the table, and a swinging link pivoted on an arm of the rock lever and adapted to engage with a stop when the anvil is raised to a certain height, the improvement which consists in providing adjustable eccentric bushings in the rock lever and table, said bushings carrying the pins to which the connecting rod is secured, in combination with a finger carried on the rock lever and arranged to contact with the swinging link and swing it out from its normal stop engaging position when the table is in rolled over position.

4. In a molding machine having a base, floating anvil, mold support, a roll over table hinged to said support, and means for causing a vertical movement of the anvil to communicate a roll over movement to the table including a rock lever pivoted on the anvil, a connecting rod connecting said rock lever to the table, and a swinging link pivoted on an arm of the rock lever and adapted to engage with a stop when the anvil is raised to a certain height, the improvement which consists in providing adjustable eccentric bushings in the rock lever and table, said bushings carrying the pins to which the connecting rod is secured, in combination with a finger carried on the rock lever and arranged to contact with the swinging link and swing it out from its normal stop engaging position when the table is in rolled over position, and a fixed stop on the anvil against which the rock lever abuts when the table is in pattern drawing position.

5. In a jar molding machine, a floating anvil having a cylinder formed in it, in combination with a mold supporting table and a piston working in the cylinder formed in the anvil and secured to said table by a yielding joint.

6. In a roll over jar molding machine having a floating anvil which serves also as a piston for actuating the rock over table and drawing the pattern, a cylinder in which said piston moves, an exhaust valve for relieving pressure in said cylinder, and two sets of mechanism attached to opposite sides of the anvil piston for rolling over the table set in action by the engagement of an element of each set of mechanism with stops, the improvement thereon which consists in making the stops relatively movable and combining with them a movable anchoring device for holding them in normally fixed operative position and mechanism for actuating the exhaust valve to open it when one stop is moved appreciably out of registry with the other.

7. In a roll over jar molding machine having a floating anvil which serves also as a piston for actuating the rock over table and drawing the pattern, a cylinder in which said piston moves, and exhaust valve for relieving pressure in said cylinder, and two sets of mechanism attached to opposite side of the anvil piston for rolling over the table, each set consisting of a rock lever secured to the anvil, a connecting rod secured to the rock lever and the roll over table by adjustable eccentric bushings, swinging links pivoted to arms of the rock lever and engaging when the anvil piston is raised to roll over the table with stops, the improvement thereon which consists in making the stops relatively movable and combining with them a movable anchoring device for holding them in normally fixed operative position and mechanism for actuating the safety valve to open it when one stop is moved appreciably out of registry with the other.

8. In a roll over jar molding machine having mechanism supported on the anvil and operating to turn over the rock over table when the anvil is raised through a certain distance, the combination with the turn over mechanism, of means for supporting its weight and taking up lost motion in its connections during the operation of the machine in jarring a mold.

9. In a roll over jar molding machine having mechanism supported on the anvil and operating to turn over the rock over table when the anvil is raised through a certain distance, the combination with the turn over mechanism, of means for supporting its weight and taking up lost motion in its connections during the operation of the machine in jarring a mold, consisting of a cylinder connected to the air supply during the jarring operation of the machine, a piston working in said cylinder, and a supporting device brought into action on said mechanism by said piston.

10. In a roll over jar molding machine having a floating anvil serving also as a piston operative during the roll over operation of the machine and an auxiliary cylinder and piston operative during the roll over operation, said auxiliary cylinder being supplied by liquid put under pressure when compressed air is admitted to the cylinder in which the floating anvil works, the improvement which consists in providing for the admission and exhaust of liquid from the auxiliary cylinder by a valve opening freely to admit liquid to the cylinder and closing against exhaust flow, in combination with an exhaust port, a valve with a vertical passage formed in it operating to partly close said exhaust port when seated on it, and means for lifting said valve from its seat actuated by the auxiliary piston and operating to lift and hold said valve from its seat only during a period when the piston is a determined distance above its lowest position.

11. In a roll over jar molding machine having a floating anvil serving also as a piston operative during the roll over operation of the machine and an auxiliary cylinder and piston operative during the roll over operation, said auxiliary cylinder being supplied by liquid put under pressure when compressed air is admitted to the cylinder in which the floating anvil works, the improvement which consists in providing for the admission and exhaust of liquid from the auxiliary cylinder by a valve opening freely to admit liquid to the cylinder and closing against exhaust flow, in combination with an exhaust port, a valve with a vertical passage formed in it operating to partly close said exhaust port when seated on it, means for lifting said valve from its seat actuated by the auxiliary piston and operating to lift and hold said valve from its seat only during a period when the piston is a determined distance above its lowest position, and a second exhaust valve held seated by spring pressure.

12. In a roll over jar molding machine having a floating anvil serving also as a piston operative during the roll over operation of the machine and an auxiliary cylinder and piston operative during the roll over operation, said auxiliary cylinder being supplied by liquid put under pressure when compressed air is admitted to the cylinder in which the floating anvil works, the improvement which consists in providing for the admission and exhaust of liquid from the auxiliary cylinder by valve mechanism consisting of a casing connected to the source of liquid supply and to the bottom of the auxiliary cylinder, and having a valve seat formed near its top, in combination with a valve slidingly supported in the casing and adapted to seat itself on said valve seat, said valve being formed with a central perforation and a downwardly facing valve seat surrounding it, a second valve, normally held against said valve seat by a spring abutted against an extension of the first valve and formed with a central perforation having an upwardly facing valve seat surrounding it, a third valve adapted to seat itself on the valve seat of the second valve, and having a restricted passage formed through it, and means actuated by the auxiliary plunger for holding said third valve away from the seat when the piston is a determined distance from the lower piston.

WILFRED LEWIS.